Jan. 16, 1968 W. F. WILSON 3,363,933
ALUMINUM DUMP BODY WITH TRANSVERSE FLOOR RIBS
Filed Jan. 4, 1966
2 Sheets-Sheet 1
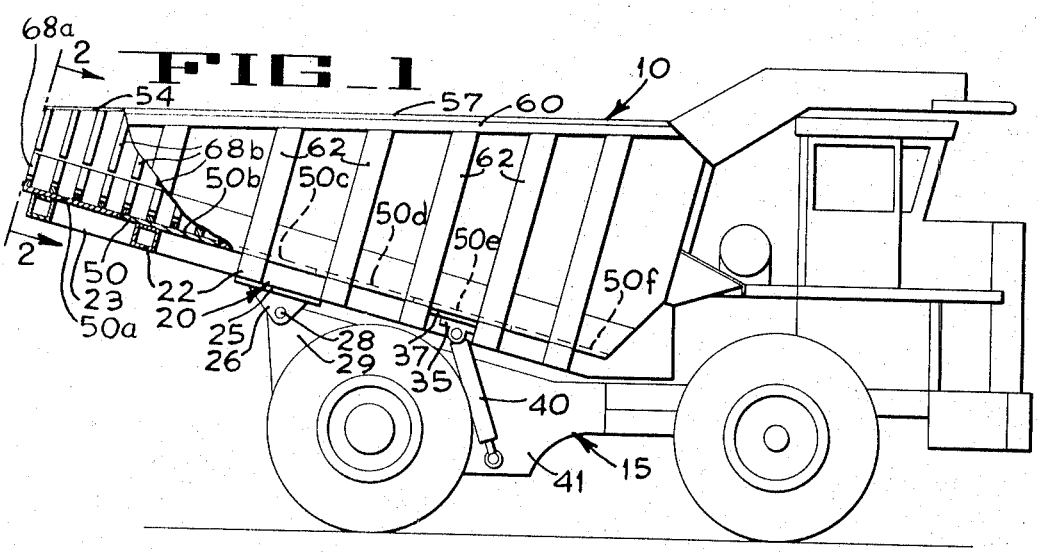
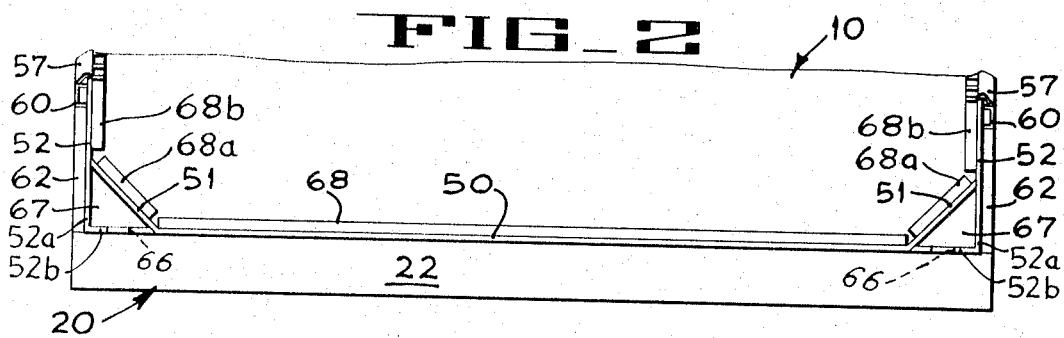
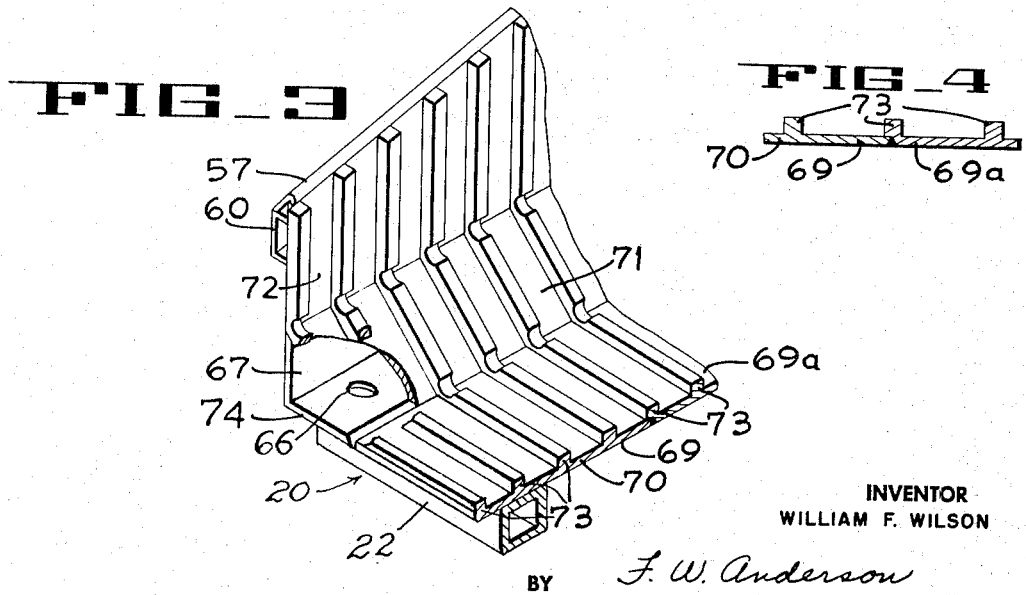
INVENTOR
WILLIAM F. WILSON
BY *F. W. Anderson*
ATTORNEY Jan. 16, 1968 W. F. WILSON 3,363,933
ALUMINUM DUMP BODY WITH TRANSVERSE FLOOR RIBS
Filed Jan. 4, 1966 2 Sheets-Sheet 2
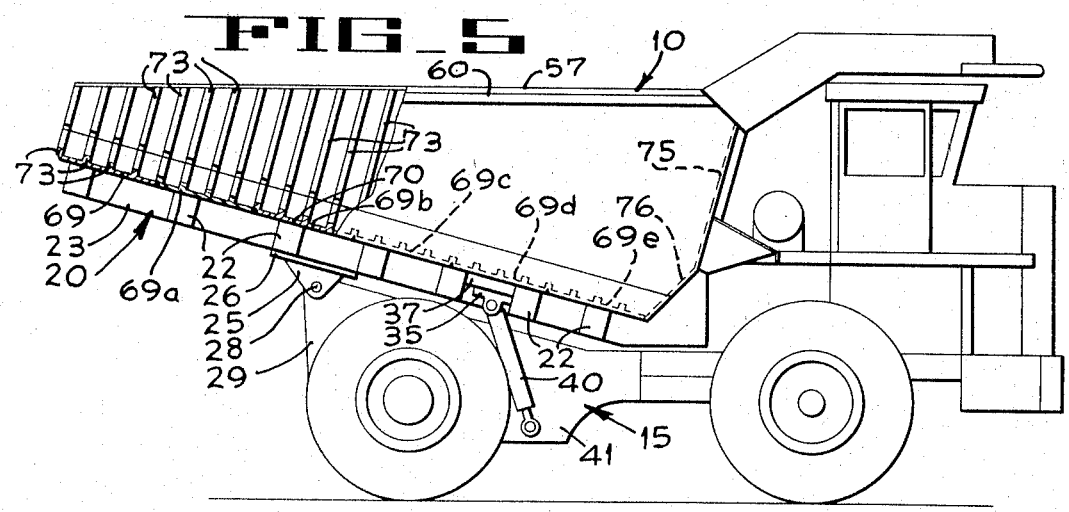
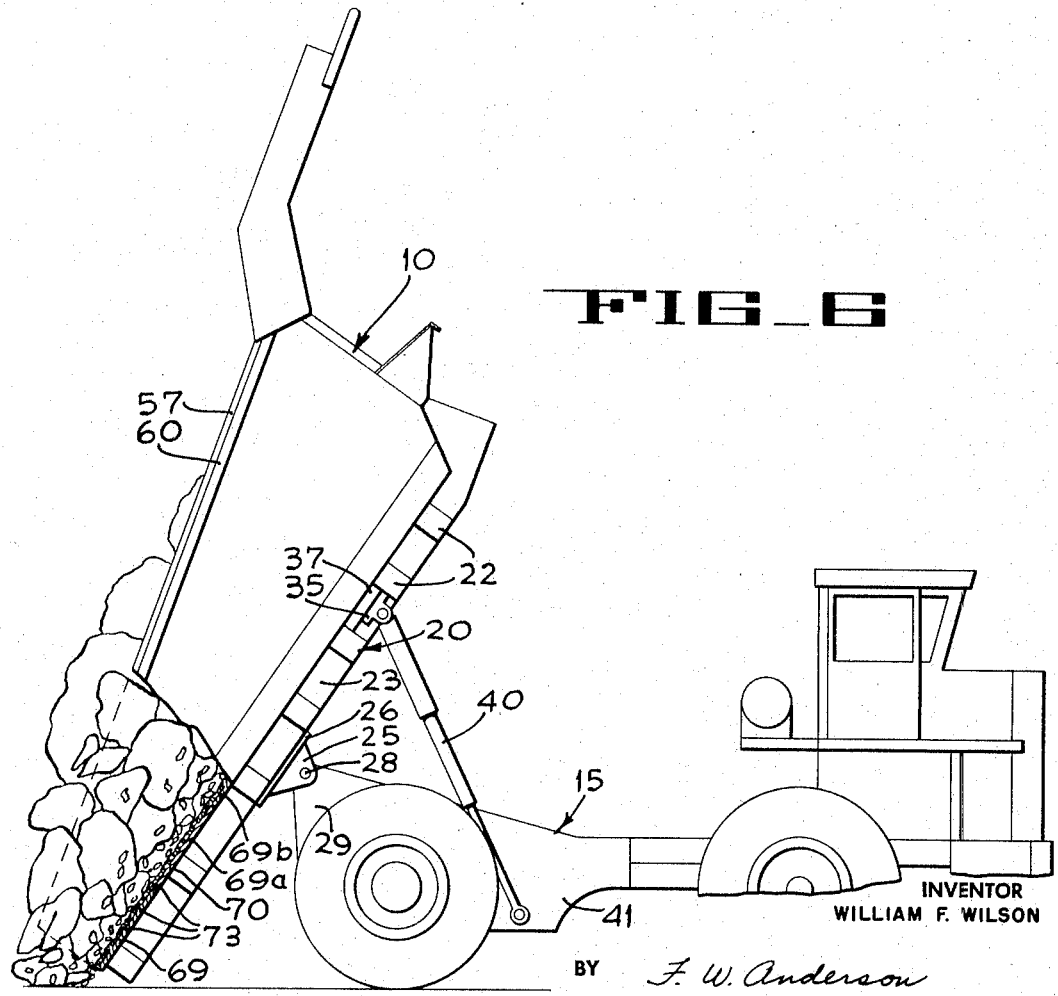
INVENTOR
WILLIAM F. WILSON
BY F. W. Anderson
ATTORNEY

United States Patent Office 3,363,933
Patented Jan. 16, 1968

3,363,933
ALUMINUM DUMP BODY WITH TRANSVERSE FLOOR RIBS
William F. Wilson, San Jose, Calif., assignor to FMC Corporation, San Jose, Calif., a corporation of Delaware
Filed Jan. 4, 1966, Ser. No. 518,657
6 Claims. (Cl. 296—28)

ABSTRACT OF THE DISCLOSURE

A vehicle body for transporting bulk materials such as abrasive ores, as mined, is provided with ribs projecting upward from the bottom wall and extending transversely to the direction in which the material is eventually discharged from the body. During loading and transport, small particles of the ore gravitate onto the bottom wall between the ribs and, relative to the large particles of the ore supported thereby, form a shear plane when the body is tilted for discharge so that the bottom wall is protected from the abrasion which would otherwise be caused by the large particles. Consequently, the body can be formed of relatively soft, ductile and lightweight aluminum and yet attain wear resistance comparable to the wear resistance of a conventional steel body.

---

This invention relates to vehicle bodies and more particularly to a light weight vehicle body having means for reducing wear and abrasion of the bed of the body during discharge of the material from the vehicle body.

At present, dump trucks that are used to move rock from one location to another are usually provided with beds and side walls made of plate steel, since steel resists the various stresses set up in the dump body during loading and carrying of the rock. Also, the steel resists the abrading action of the rock as it slides along the bed during discharge from the truck. However, a dump body made of steel is very heavy, and thus limits the carrying capacity of a given gross weight vehicle.

Accordingly, it is an object of the present invention to provide a dump truck body that is capable of carrying heavy loads, and yet is relatively light in weight, to make possible increased payload for a given gross weight of the vehicle, or to carry the same payload at less gross weight for increased economy and performance.

Another object is to provide a unique means for preventing wear and abrasion to the body during the discharge cycle.

Another object is to also utilize this means as part of the structural integrity of the body, further reducing its weight by thus omitting certain structural elements.

Another object is to provide means of protecting soft metal vehicle structures when used in transporting abrasive materials.

Another object is to take advantage of the impact absorption characteristic of aluminum that provides adequate resistance to the impacts of shovel loading with a lighter body structure than comparative allowable static stresses would indicate.

Another object is to provide an improved all aluminum dump truck body suitable for rock service.

Other and further features and advantages of the present invention will be apparent from the following description taken in connection with the accompanying drawings, in which:

FIGURE 1 is a side elevation of a dump truck incorporating the unique body construction of the present invention.

FIGURE 2 is an enlarged fragmentary end view taken looking in the direction of arrows 2—2 of FIGURE 1.

FIGURE 3 is an enlarged fragmentary perspective of one rear corner of the bed of the truck body of FIGURE 1.

FIGURE 4 is an enlarged fragmentary section showing a part of the bed.

FIGURE 5 is a side elevation, similar to FIGURE 1, but with parts broken away and parts shown in phantom lines to disclose the inside of the truck body.

FIGURE 6 is a side elevation of the truck of FIGURE 5 showing the body in load-dumping position.

Tremendous impact forces are applied to a truck bed when it is loaded by power shovel. The structure must be severely over-designed for static load to provide the strength to withstand these impacts, or the dynamic load. Current practice is to use the higher strength steels in order to keep the weight to a minimum consistent with sufficient ruggedness. Aluminum by its very nature will absorb considerably more impact than will steel, for reasons well known in the art. Because of this characteristic, and its light weight, it is a most desirable metal to use in this type of structure. However, it is very soft and ductile, and wears rapidly from the sliding, during the discharge cycle, of the great weight of abrasive material carried on the bed.

Current aluminum rock bodies employ a steel liner to circumvent this problem, resulting in little weight saving compared to an all steel body. In accordance with the teaching of the present invention, means is provided for forming a protective layer of material between the bedplate and the downwardly moving load to prevent this abrasive action, thus allowing an entirely aluminum structure for minimum weight. More particularly, means is provided for accumulating a layer of small rock particles along the bed and causing this layer to remain in position as the load moves downwardly toward the discharge end of the bed. Thus, this layer of rock particles protects the bedplate from gouging and wear due to abrasion since there is little direct contact of the sliding load with the bedplate itself. The interface of the small rock particles and the load of larger particles forms a shear plane spaced from the bedplate so that the bedplate is insulated from abrasive contact with the load.

In the embodiment of the dump truck body 10 of the present invention that has been chosen for illustration in FIGURE 1, the body 10 is mounted on the chassis 15 of a heavy duty 65 ton truck of the type marketed by LeTourneau-Westinghouse Company of Peoria, Ill. under the model number of Haulpak 65. The body 10 has a base 20 in the form of a grid of transverse aluminum channels 22 and longitudinal channels 23 welded together. A pair of longitudinally extending hinge brackets 25 (one only being shown) are rigidly secured to and extend downwardly from plates 26 that are rigidly secured to the base 20. The two hinge brackets are disposed on opposite sides of the longitudinal centerline of the grid and are spaced equal distances from the centerline. Each bracket is pivotally connected by a pin 28 to a member 29 of the chassis 15 so that the base can pivot upwardly away from the chassis on the two axially aligned pins 28. A pair of hydraulic cylinder mounting members 35 (one only being shown) are rigidly secured to the base, each member 35 having a pivot socket therein which is aligned transversely of the base with the socket in the other member 35. The two members 35 are disposed on opposite sides of the longitudinal centerline of the base and are spaced equal distances from said centerline, each member being secured to a plate 37 that is welded between two transverse channels 22. A three-stage telescoping hydraulic power cylinder 40 is pivotally connected to each member 35 and to a portion 41 of the chassis. As seen in FIGURE 6, when the two power cylinders are energized, the truck body is swung upwardly about the pins 28.

The body 10 includes a floor plate 50 (FIG. 2) made of aluminum plate that is one inch thick and is welded to the base structure 20. In this embodiment, the floor plate consists of transverse plates 50a-50f (FIG. 1) welded side by side, with both ends 51 (FIG. 2) of each plate upwardly inclined. Vertical side plate members 52 are welded to the ends 51 of the floor plates and to each other side by side in the same manner as the floor plate. The upper edge of each vertical wall 52 is cut off at an angle, as at 54 (FIGURE 1), and a curved deflector plate 57 is welded to the upper edges of the adjacent top edges of the several wall sections, immediately above a channel 60 that is welded to the outer faces of the adjacent walls 52 near the upper edges of the walls. Vertical stiffening channels 62 extend from the upper longitudinal channel 60 down to connect with the transverse channels 22 of the base 20. With all elements welded together, an extremely strong load carrying structure is achieved. A triangular passage 67, that is formed at each side of the bed by a lower portion 52a and an inturned portion 52b of the wall 52 and the inclined portion 51 of the bedplate, is closed (by means not shown) at each end to form a passage or duct for engine exhaust gases to pass through and heat the body as is common practice. Openings 66 are cut in the walls of the ducts 67 where appropriate to allow these gases to flow through the channels 22 and 23 of the entire sub-structure 20 and thus heat the entire bottom.

As previously mentioned, the present invention provides means for retaining a layer of rock particles on the bed of the truck body to protect the bedplate. This layer-retaining means consists of transverse bars or ribs 68 secured as by welding to the floor plate 50. In the illustrated embodiment, these aluminum bars are one inch high, two inches wide, and are spaced on nine inch centers. Similar bars 68a and 68b are welded to the inclined portion 51 and the upper portion of the vertical wall 52 respectively.

An improved embodiment (FIGS. 3-5) employs aluminum extrusions, in which the bars or ribs are an integral part of the plate. These extrusions 69 are disposed transversely of the chassis and include a flat central section 70 (FIG. 3), an upwardly inclined section 71 at each end of the central section, and a vertical section 72 projecting upwardly from the upper end of each inclined section 71. Ribs 73 are formed integral with the sections 70-72.

These transverse sections, of as wide an extrusion as is practical to obtain, are welded together side by side in the same manner as the embodiment previously described to form the bed, inclined sides, and vertical walls of the body. The channels 60, and deflector plates 57 are welded in place, and the whole structure welded to the sub base 20. Because of the integral ribs 73, the side stiffeners 62 are no longer needed. An angle member 74 is welded to each side of the structure and of the base 20 to form gas conduits. This embodiment is as strong as the FIGURE 1 structure, but is considerably lighter in weight by virtue of more strategic use of the material.

In a truck body having a bed that is approximately 18 feet long and 13 and a half feet wide, each of the six extruded sections 69-69e (FIG. 5) may be three feet deep and the ribs 73 may be spaced nine inches apart. The sections 70-72 may be one-half inch thick, and the ribs 73 may be one inch high and one inch wide, except certain end ribs which are formed as shown in FIGURE 4. The forward end of the truck body is closed by a transverse aluminum plate 75 (FIG. 5) that extends from one side wall to the other and has a lower end portion 76 that is inclined rearwardly.

Other extrusion depths, plates, types of weld joints, materials, rib size and spacing, or methods of fabrication may be used, all of which come within the scope of this invention, namely, to provide means of retaining a layer of material on the bed of the truck body, and utilization of this means as part of the structural integrity.

Referring to FIGURE 5, it will be evident that while a truck loaded with rock or the like travels from the loading station to the area at which the load is to be deposited, the smaller particles of material in the load will work their way down to the bed of the body and become positioned between the ribs 68 or 73. Accordingly, a layer of relatively small particles is formed on the bedplate, said layer extending between the ribs and overlying the upper surfaces of the ribs. The interface of the small particles and the large particles constituting the load acts as a shear plane spaced from the bedplate. When the place at which the load is to be dumped is reached and the body is swung upwardly to discharge the load as shown in FIGURE 6, the load starts to move downwardly as soon as the angle of repose of the material is exceeded. As the heavy material gains momentum, it tends to slide as a mass on the bedplate and abrade and scrape the surface of the bedplate. However, the layer of relatively small material particles cushions the impacts of the downwardly moving material and provides an insulating layer which causes the material to slide to the end of the bed with very little contact with even the top surfaces of the ribs. Accordingly, the major portion of the load tumbles and slides along the bed and is discharged with relatively little damage to the bedplate. The ribs 73, that extend along the inclined portions 71 of the bedplate of FIGURE 3-6 and along the vertical portions 72 of the bedplate, function in substantially the same manner to protect the adjacent portions of the bedplate. In each instance, the transverse ribs 68 or 73 trap a bed of small particles which forms a shear plane with the load so that the bedplate is insulated from abrasive wear when the load is discharged.

While the truck bodies shown in FIGURES 1-6 are provided with transverse ribs 68 and 73 all the way to the front wall 76, it should be understood that the provision of the ribs near the discharge end of the bed is of prime importance since all of the material must roll or slide over this portion of the bed, and experience has shown that this is inherently the area of greatest wear. Accordingly, it is within the scope of the present invention to provide the transverse ribs only over a limited area at the discharge end of the bed, as for example, an area extending from the extreme rear end of the bed to a point about one-third of the distance to the forward wall 75. However, if this is elected in the case of the embodiment of FIGURES 3-6, supplementary stiffening must be supplied especially in the areas where the vertical ribs are eliminated.

Also it should be understood that, while the layer forming and retaining apparatus of the present invention has particular value in conventional dump trucks wherein the bed is swung upwardly at the front to cause the load to be discharged out of the lower rear end, this apparatus can be used in many vehicles or carriers such as a carrier that pivots about a longitudinal axis to discharge the load sidewise, or a carrier that is rotated 180 degrees to a discharge position. Also, the ribbed construction may be incorporated in the dumping doors of carriers that have a bed formed by downwardly swinging dumping doors. In general, the bedplate construction can be used in any structure wherein moving material ordinarily causes damage to a support surface due to impact loads and high friction loads.

Having thus described my invention what I claim as new and desire to protect by Letters Patent is:

1. A vehicle dump body comprising a support member having upstanding side walls, said support member being pivotally mounted on a vehicle chassis and including a flat support surface on which material transported in said body rests during movement of the vehicle and a discharge end across which the material moves when it is discharged; and a plurality of spaced, rigid projections secured to said support surface and extending between said side walls across said discharge end, said projections retaining small particles of the material along the surface of said support member in a layer to form a shear plane spaced from said support surface for larger particles supported by said small particles, thereby insulating said support surface from abrasion as the larger particles are discharged.

2. The vehicle dump body of claim 1 wherein said support member includes at least one aluminum extrusion having flat plate-like panels providing said support surface and said side walls, and a plurality of spaced bars projecting inward from said panels to define said projections of said support surface and projections on the side walls.

3. The vehicle body of claim 1 wherein said support surface and said projections are made of aluminum whereby a lightweight, durable body is provided.

4. A vehicle body according to claim 1 wherein said support member includes a central portion and opposite side portions each projecting diagonally upward from said central portion and being secured to one of said side walls.

5. A vehicle body according to claim 4 including means cooperating with each inclined side member to define a duct extending longitudinally at each side of the vehicle body, and means defining passages communicating with said ducts and extending under the central portion of said support member to direct heated gases from said ducts along the underside of the central portion.

6. A vehicle body according to claim 1 wherein said projections are provided only at the discharge end portion of the support surface over an area where impact and abrasion action is greatest and extending for approximately one-third the distance from the rear end of the surface toward the forward end thereof.

References Cited

UNITED STATES PATENTS

| | | | |
|---|---|---|---|
| 964,429 | 7/1910 | Johnston | 214—152 |
| 1,416,073 | 5/1922 | Steinbach | 193—32 |
| 1,502,272 | 7/1924 | Sayre | 193—2 |
| 2,311,501 | 2/1943 | Zoldok | 193—2 |
| 2,910,322 | 10/1959 | Magor | 296—28 |
| 2,955,687 | 10/1960 | Seim | 105—422 |
| 2,974,997 | 3/1961 | Parsley | 296—28 |

FOREIGN PATENTS 1,023,079  12/1952  France.

OTHER REFERENCES

Unger: German App. No. 1,131,173, pub. June 1962.

RICHARD J. JOHNSON, *Primary Examiner.*